(12) United States Patent
Boulos et al.

(10) Patent No.: US 6,632,760 B2
(45) Date of Patent: Oct. 14, 2003

(54) CHROME-FREE GREEN PRIVACY GLASS COMPOSITION WITH IMPROVED ULTRA VIOLET ABSORPTION

(75) Inventors: Edward Nashed Boulos, Troy, MI (US); James Victor Jones, Nashville, TN (US)

(73) Assignee: Visteon Global Technologies, Inc., Dearborn, MI (US)

( * ) Notice: Subject to any disclaimer, the term of this patent is extended or adjusted under 35 U.S.C. 154(b) by 72 days.

(21) Appl. No.: 09/970,172

(22) Filed: Oct. 3, 2001

(65) Prior Publication Data

US 2003/0130105 A1 Jul. 10, 2003

(51) Int. Cl.$^7$ .............................................. C03C 3/087
(52) U.S. Cl. ....................................................... 501/71
(58) Field of Search ..................................... 501/70, 71

(56) References Cited

U.S. PATENT DOCUMENTS

| | | |
|---|---|---|
| 4,104,076 A | 8/1978 | Pons |
| 5,112,778 A | 5/1992 | Cheng et al. |
| 5,214,008 A | 5/1993 | Beckwith et al. |
| 5,240,886 A | 8/1993 | Gulotta et al. |
| 5,308,805 A | 5/1994 | Baker et al. |
| 5,320,986 A | 6/1994 | Taniguchi et al. |
| 5,346,867 A | 9/1994 | Jones et al. |
| 5,352,640 A | 10/1994 | Combes et al. |
| 5,393,593 A | 2/1995 | Gulotta et al. |
| 5,411,922 A | 5/1995 | Jones |
| 5,521,128 A | 5/1996 | Jones et al. |
| 5,558,942 A | 9/1996 | Itoh et al. |
| 5,582,455 A | 12/1996 | Casariego et al. |
| 5,593,929 A | 1/1997 | Krumwiede et al. |
| 5,726,109 A | 3/1998 | Ito et al. |
| 5,776,845 A | 7/1998 | Boulos et al. |
| 5,830,812 A | 11/1998 | Shelestak et al. |
| 5,851,940 A | 12/1998 | Boulos et al. |
| 5,877,102 A | 3/1999 | Dupont et al. |
| 5,877,103 A | 3/1999 | Dupont et al. |
| 5,932,502 A | 8/1999 | Longobardo et al. |
| 5,952,255 A | 9/1999 | Seto et al. |
| 5,962,356 A * | 10/1999 | Boulos et al. ................ 501/70 |
| 5,977,002 A | 11/1999 | Boulos et al. |
| 6,287,998 B1 * | 9/2001 | Seto et al. .................... 501/71 |
| 6,408,650 B1 * | 6/2002 | Boulos et al. ............. 65/134.3 |

FOREIGN PATENT DOCUMENTS

| EP | WO 95/16641 | 6/1995 |
|---|---|---|
| EP | 1013620 A * | 6/2000 |

* cited by examiner

*Primary Examiner*—David Sample
(74) *Attorney, Agent, or Firm*—Brinks Hofer Gilson & Lione

(57) ABSTRACT

The present invention provides for a new improved green privacy glass. In accordance with the teachings of the present invention, the iron is oxidized with the help of inexpensive manganese oxide. No chromium, cerium nor titanium oxides are added to obtain the desired green color. The glass has a %UV less than 13% at 4.0 MM. This low UV absorption could eliminate the need for a black band in glass to prevent the fading of the color in glass.

12 Claims, 1 Drawing Sheet

CHROME-FREE GREEN PRIVACY GLASS COMPOSITION WITH IMPROVED ULTRA VIOLET ABSORPTION

TECHNICAL FIELD OF THE INVENTION

The present invention is generally directed towards a green glass used as automotive or architectural glass. More particularly, to a soda-lime-silica glass having improved UV absorption and low to medium visible light transmittance.

BACKGROUND OF THE INVENTION

As is well known in the art, iron oxide is commonly used to provide a green color to glass. In the glass, the iron oxide exists in two chemical forms, an oxidized form: $Fe_2O_3$ wherein the iron is $Fe^{+3}$ and a reduced form: FeO wherein the iron is $Fe^{+2}$. Advantageously, the oxidized form of iron oxide absorbs a portion of the ultra violet (UV) light passing through the glass product and the reduced form absorbs a portion of the infrared (IR) light passing through the glass product. As would be appreciated, the UV and IR light absorption properties of iron oxide are especially valuable when the glass is used in automobiles. When heat is absorbed by the glass, the load on air conditioners is initially reduced and there is less total heat in the vehicle to cool. When the ultra violet absorption is improved, there is less damage over time to the colors of the components inside the vehicle and provides for more passenger comfort. Therefore, controlling these spectral properties of the glass is very important.

Under composition batching and furnace firing conditions generally used in the glass industry, if the total iron oxide as $Fe_2O_3$ in the glass composition is within about 0.3 to 2.0 wt. %, the iron oxide equilibrium provides a $Fe^{+2}/Fe^{+3}$ weight ratio greater than 0.35. Adding iron oxide to the glass under normal furnace conditions improves both the UV and the infrared absorption of the glass since the concentration of the iron forms is correspondingly increased, but this improvement is at the expense of visible transmittance. That is, as iron oxide is added the color of the glass darkens so that the visible transmittance is correspondingly decreased.

It would be extremely advantageous to improve the UV absorption of green glass products while maintaining a high level of visible transmission and to also have a good absorption in the IR portion of the spectrum. These advantages could possibly be obtained by including more iron oxide in the glass composition while providing a more oxidizing environment in the glass furnace to shift the iron oxide towards its oxidized form. This would increase the UV absorption of the glass. And by shifting the iron oxide away from its darker reduced form towards the oxidized form, even more iron oxide perhaps could be added to the batch to further improve UV and IR light absorption. All of this could possibly be done while still maintaining good visible transmittance properties of the glass.

One way commonly employed to shift towards a more oxidizing environment in the glass furnace is by providing additional air to the glass melt in the furnace. Increasing the amount of air, however, has several undesirable consequences: the furnace cools down, the combustion heating of the furnace becomes inefficient which requires a fuel gas increase and also the increased oxygen can promote the formation of undesirable $NO_x$ emissions in the combustion products.

Sodium sulfate, a fining agent often added to the glass melt to remove bubbles from the glass, can also act as an oxidizing agent. Increasing the sodium sulfate in the glass batch in an amount to effectively oxidize the batch, however, is also less than desirable. Excess sodium sulfate can generate undesirable $SO_x$ emissions once the saturation point of solubility of sulfate in the glass melt is reached. Anthracite coal (a reductant) is another material typically used in glass melts along with sodium sulfate. It causes sodium sulfate to break down into sodium oxide which becomes part of the glass and sulfur trioxide which generates the fining action to remove bubbles in the melt. The glass batch can be made oxidizing by simply removing the coal from the batch, but then the break down of the sodium sulfate requires that the temperature in the furnace be raised which makes for less efficient furnace operation. Generally, increasing the quantity of sodium sulfate in the glass tends to shift the iron oxide equilibrium toward oxidizing while increasing carbon concentration in the glass batch shifts the iron oxide equilibrium toward reducing. Furnace temperature also affects iron oxide equilibrium. Increased temperature shifts the iron oxide toward the reduced state and lowering overall furnace temperature allows the iron oxide to move toward the oxidized state. Generally lowering furnace temperatures, however, can potentially lead to defects in the final glass product.

An often used and well known oxidizing material, sodium nitrate, can also be added to the glass batch to shift the iron oxide towards its oxidized form. It is only effective, however, as an oxidizer in the early stages of glass melting which limits control of the iron oxide redox equilibrium. Another more negative aspect of using sodium nitrate is that environmentally undesirable nitrogen oxide emissions are generated. Thus, attempting to shift the redox equilibrium toward the oxidized iron oxide form by using sodium nitrate is less than satisfactory for several reasons.

As it can be clearly appreciated from the above discussions, there are significant difficulties associated with providing and maintaining particular oxidizing conditions in a glass melt furnace to control the redox ratio of the iron oxide. To avoid these difficulties, UV absorbing materials like oxides of cerium, titanium, vanadium, and chromium are often added to the glass batch to increase the UV absorption of the glass. When used, however, they are included in the glass in very small quantities, which only provide limited UV improvement. One reason for using only small quantities is that some of these additives are very expensive. Cerium oxide, in particular, can more than double the batch cost when used in a sufficient quantity to adequately improve the ultra violet absorption of glass products. Titanium dioxide is less expensive than cerium oxide but is still much more expensive than iron oxide. Chromium oxide must also be used in extremely small quantities because while the oxidized form of chromium oxide absorbs in the ultra violet portion of the spectrum, the reduced form of chromium absorbs in the visible portion of the spectrum causing a loss of the visible transmission and much stronger color in the glass product. Vanadium oxide also has been known to deteriorate furnace refractories. Therefore the improvement in UV absorption that can be obtained by using such additives is commercially limited.

SUMMARY OF THE INVENTION

In the present invention a unique and commercially desirable way to improve the UV and the IR absorbing properties of a green glass composition while maintaining desirable visible light transmittance is disclosed. In accordance with the teachings of the preferred embodiment a manganese compound like manganese dioxide in the glass melt along with the iron oxide is added. Manganese dioxide is found to be an excellent and inexpensive oxidizer of the glass melt which avoids the drawbacks of prior art oxidizers like sodium nitrate.

In another aspect of the preset invention, the green glass tint is obtained by eliminating the use of chromium. The present invention is a green soda-lime-silica glass composition that is heat absorbing and has improved ultra violet light absorption, including a manganese compound in the glass melt forces the glass composition batch towards strongly oxidizing furnace conditions so that the iron oxide in the melt is directed toward its oxidized form. Glass products made according to embodiments of the invention have the following spectral properties at 4.0 mm. thickness: 15 to 45% light transmittance using Illuminant A (LTA) and less than 13% ultra violet (UV) transmittance measured over the range of 300 to 400 nanometers. Generally, as the quantities of the colorants increase, both the % LTA and % UV trasmittance will go down. Similarly, as the glass thickness increases for a given glass composition, the transmittance of the thicker glass decreases. Preferably, the dominant wavelength at a glass thickness of 4 mm is between 494 to 563 nanometers.

According to another aspect of the invention, it is a method for improving the ultraviolet light transmittance while maintaining low to medium visible light transmittance of a soda-lime-silica green glass composition using iron oxide as a colorant by including a manganese compound along with the iron oxide during melt processing of the glass composition. The method comprises admixing components which result in the glass composition disclosed above.

These and still other advantages of the present invention will become apparent from the detailed description.

BRIEF DESCRIPTION OF THE DRAWINGS

Further features and advantages of the invention will become apparent from the following discussion and the accompanying drawings in which.

DETAILED DESCRIPTION OF THE PREFERRED EMBODIMENT

Figure 1:
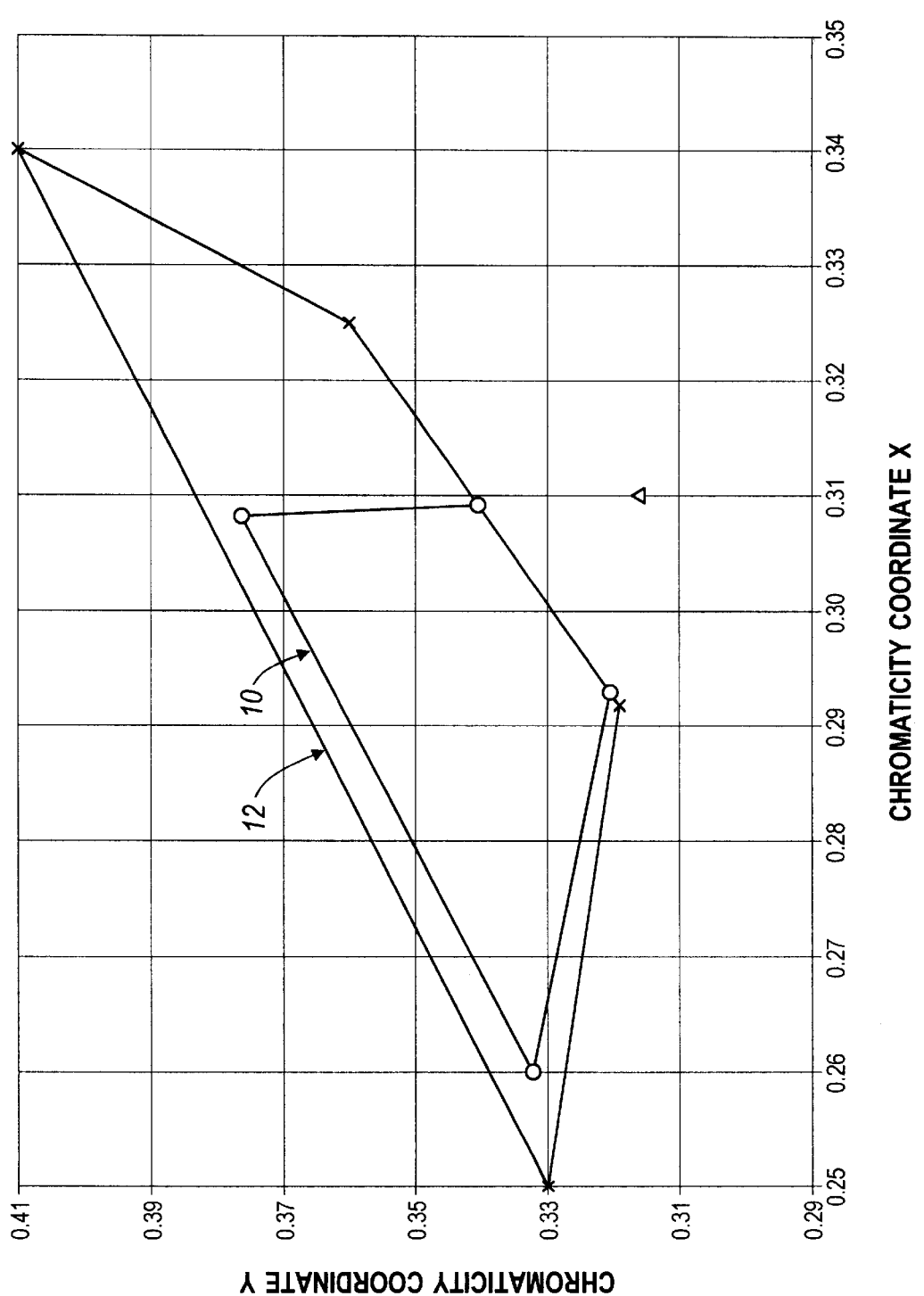
FIG. 1 is a graphical representation of the chromaticity coordinates of the glass in accordance with the teachings of the present invention.

The following description of the preferred embodiment is merely exemplary in nature and is in no way intended to limit the invention or its application or uses.

Flat soda-lime-silica glass, used in the automotive and architectural industries and conveniently made by the float glass process, is generally characterized by the following basic composition shown in Table I, the amounts of the components being based on a weight percentage of the total glass composition:

TABLE I

| Base Glass Components | Weight % |
| --- | --- |
| $SiO_2$ | 70 to 74 |
| $Al_2O_3$ | 0 to 5 |
| CaO | 5 to 15 |
| $Na_2O$ | 10 to 18 |
| MgO | 0 to 10 |
| $K_2O$ | 0 to 5 |

As used herein, all "weight %" values are based on the total weight of the final glass composition. In accordance with the preferred embodiment, in the present invention a number of ultraviolet and infrared radiation absorbing materials and colorants in form of iron, manganese, selenium and cobalt are added to the base composition described above.

In addition, to the base the coloring components of green glass composition consists essentially of: (i) greater than 1.3% and up to 3.0 wt. % total iron oxide as $Fe_2O_3$; (ii) greater than 0.4% and up to 1.5% of manganese compound in form of $MnO_2$; (iii) 0.0075% to 0.03% of Cobalt as Cobalt Oxide; and (iv) optionally any selenium oxide, preferably up to 0.0025%. As would be known in the art, melting and refining aids are routinely included in glass manufacture and may also be used herein. One refining aid generally used to remove bubbles from the glass is sodium sulfate, which results in $SO_3$ in the glass.

Glass products made according to embodiments of the invention have the following spectral properties at 4.0 mm. thickness. 15 to 45% light transmittance using Illuminant A (LTA) and less than 13% ultra violet (UV) transmittance measured over the range of 300 to 400 nanometers. All of the examples herein use this range for the UV transmittance. IR transmittance in the range of about 4 to 26%, the IR transmittance is measured over 760 to 2120 nanometers. The total iron oxide as $Fe_2O_3$ is present in the invention composition in quantities of 1.3 to 3.0 weight %, more preferably being 1.5 to 3.0 weight percent.

As discussed above, iron oxide exists in two forms in the glass melt. The oxidized form of iron oxide absorbs UV light and the reduced form of iron oxide absorbs infrared light, hence lowering their transmittance through the glass products. In the present invention, in order to enhance the oxidizing conditions in the glass melt, a manganese compound is added to the glass composition.

The manganese compound is present in the invention composition in an amount of 0.40 to 1.5 wt. % based on $MnO_2$. This manganese compound can be added to the batch glass components in a variety of forms, for example, but not limited to, $MnO_2$, $Mn_3O_4$, MnO, $MnCO_3$, $MnSO_4$, $MnF_2$, $MnCl_2$, etc. As would be appreciated, a mixture of such compounds may also be employed. The manganese compound, for example, manganese dioxide acts as an oxidizer to the iron oxide such that redox equilibrium of the iron oxide is shifted toward its oxidized form, $Fe_2O_3$. Manganese dioxide and iron oxide interact with each other in the glass melt according to the following reactions:

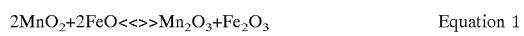

$$2MnO_2 + 2FeO \Longleftrightarrow Mn_2O_3 + Fe_2O_3 \qquad \text{Equation 1}$$

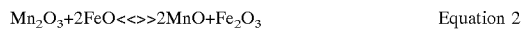

$$Mn_2O_3 + 2FeO \Longleftrightarrow 2MnO + Fe_2O_3 \qquad \text{Equation 2}$$

Thus, manganese dioxide is added to the glass batch, the equilibrium in Equation 1 is shifted toward the right. Furthermore, the reaction proceeds as in Equation 2 toward the right again and the net result is that more of the iron oxide is shifted toward the oxidized form ($Fe_2O_3$) while the manganese oxide is changed to its reduced (colorless) MnO form. If $Mn_2O_3$, is used as the initial batch component, then the reaction follows Equation 2. Since the manganese compound, when added to glass batches containing iron oxide is reduced towards its colorless form and as well the iron oxide is shifted away from its darker reduced form (FeO), more iron oxide may be added to the batch to enhance both the ultraviolet and the infrared absorption while simultaneously maintaining a high visible transmittance. Preferably it is most desirable to use the manganese oxide or manganese carbonate compounds in the batch.

As is known in the industry, when making soda-lime-silica glass compositions, titanium dioxide generally enters as an impurity from the raw materials, e.g., with the sand, dolomite or limestone. The level of impurity that generally is present ranges normally from about 0.015 to about 0.05 wt. %, depending of the source of the raw materials. Typically about 0.02 wt. % of titanium oxide will be present in the glass even when no titanium oxide has been intentionally added as a colorant to the glass melt. Other UV absorbents may be added to obtain glass with desired UV properties. Such UV absorbents may include selenium, cobalt in form of cobalt oxide. However, the glass of the present invention relies on the oxidized portion of iron oxide that is increased when manganese dioxide shifts the iron equilibrium and selenium additions further enhance the UV absorption. No other UV absorbers such as cerium, titanium, chromium nor vanadium oxides are needed to achieve the desired result.

The following Table II lists ingredients that are preferably used to form the embodiments of green glass compositions according to the present invention.

TABLE II

| Batch Materials | Range Mass (Lbs) |
| --- | --- |
| Sand | 1000 |
| Soda Ash | 324.4 |
| Limestone | 86.0 |
| Dolomite | 236.0 |
| Salt cake | 10.5 |
| Rouge | 2.1 to 3.7 |
| Cobalt Oxide | 0.14 to 0.30 |
| Brickox | 0.90 to 1.84 |
| Selenium | 0.00 to 0.02 |
| Nepheline Syenite | 2.64 |

Table III illustrates the preferred ranges of the resultant oxide ranges for the glass composition made from the above batch:

TABLE III

| Oxide Component | Weight % |
| --- | --- |
| $SiO_2$ | 70.0 to 71.5 |
| $Na_2O$ | 13.3 to 13.7 |
| $K_2O$ | 0.0 to 0.10 |
| CaO | 8.25 to 8.43 |
| MgO | 3.58 to 3.63 |
| $Al_2O_3$ | 0.60 to 0.65 |
| $SO_3$ | 0.10 to 0.30 |
| $Fe_2O_3$ | 1.3 to 3.0 |
| Co | 0.0075 to 0.03 |
| $MnO_2$ | 0.400 to 1.5 |
| Se | 0.00 to .0025 |

Table IV illustrates the preferred glass properties of the present invention.

TABLE IV

| | |
| --- | --- |
| LTA measured at 4.0 mm | 15 to 45% |
| UV measured at 4.0 mm | Less than 13% |
| IR measured at 4.0 mm | 4 to 26% |
| Dominant Wavelength at 4.0 mm | 494–563 nanometers |
| Excitation Purity at 4.0 mm | 4 to 25% |

When LTA>25% the ratio of % LTA/% UV is =>3.0;
When LTA<25%, ratio of % LTA/%UV is =>5.0
When LTA 15–25%, then UV<10% @ 4.0 mm.

As illustrated in FIG. 1, the color of the colored glass is defined by the defined by a chromaticity coordinates inside the polygons ABCDA, the chromaticity coordinates are:

| | x | y |
| --- | --- | --- |
| A | 0.292 to 0.293 | 0.319 to 0.32 |
| B | 0.25 to 0.26 | 0.33 to 0.332 |
| C | 0.308 to 0.34 | 0.376 to 0.41 to |
| D | 0.309 to 0.325 | 0.34 to 0.36 |

The smaller polygon as shown by reference numeral 10 represents the preferred color space while the larger polygon as shown by reference numeral 12 represents the full scope of the color-space of the invention.

In order to demonstrate the advantages of the present invention, glass melts detailed in all of the examples were made in the laboratory according to the following procedure: batches were weighed, placed into a glass jar about 2" high and 2" inside diameter and dry mixed for 10 minutes each on a Turbula mixer, dry batch was placed into an 80% platinum/20% rhodium crucible that stands 2" tall and has an inside diameter at the top of 2.5" and is tapered to the base which has an inside diameter of 1.75". An amount of 4.5 ml. of water is added to the dry batch in the crucible and mixed with a metal spoon. After such preparation, a group of six different batches is melted in a gas/air fired furnace at the same time for 1 hour at 2600° F. and each crucible is removed in turn from the furnace and fritted. Fritting the glass involves coating the inside of the platinum/rhodium crucible with the molten glass and then plunging the crucible into cold water.

After removing the crucible from the water and draining the water, the broken glass particles are removed from the sides of the crucible and mechanically mixed inside the crucible. All six samples are fritted in like manner and all crucibles are placed back into the furnace for another 1 hour interval at 2600° F. and the fritting procedure is repeated. After the second fritting process, the crucibles are returned to the furnace for 4 hours at 2600° F. Each crucible is removed in turn from the furnace and each molten glass sample is poured into a graphite mold with an inside diameter of 2.5". Each glass is cooled slowly, labeled, and placed into an annealing furnace where the temperature is quickly raised to 1050° F., held for 2 hours, and then slowly cooled by shutting off the furnace and removing the samples after 14 or more hours. The samples are ground and polished to about 4.0 mm. thickness and subsequently the spectral properties are measured for each sample.

All the laboratory melts made with the above procedure use a base composition of 100 grams sand, 32.22 grams of soda ash, 8.81 grams of limestone, 23.09 grams of dolomite, 1.5 grams of sodium sulfate, 0.075 grams of carbocite, 2.64 grams of nepheline syenite, and the remainder of the batch includes rouge, manganese dioxide, cobalt oxide and optionally selenium, in some example melts.

Table V demonstrates glasses wherein the % LTA is high and the % UV is in the range of 5 to 12%. Table V shows the change in ultra violet absorption when a constant amount of $MnO_2$ (0.50 wt. %) is added to various concentrations of $Fe_2b_3$. The results of Table IV, for present invention glass compositions, demonstrate that, in glasses with a constant $MnO_2$ wt. % (concentration), increasing the amount of $Fe_2O_3$, correspondingly increases the ratio of the % LTA/%UV.

TABLE V

| GLASS | Example 1 | Example 2 | Example 3 |
|---|---|---|---|
| WT. % $Fe_2O_3$ | 1.5 | 1.35 | 2 |
| WT. % FeO | 0.307 | 0.372 | 0.399 |
| WT. % $MnO_2$ | 0.5 | 0.5 | 0.5 |
| PPM Co | 75 | 100 | 75 |
| PPM Se | 0 | 0 | 0 |
| CHROMATICITY COORDINATE x | 0.286 | 0.2876 | 0.2944 |
| CHROMATICITY COORDINATE y | 0.3227 | 0.3343 | 0.3423 |
| DOMINANT WAVELENGTH | 494.2 | 500.9 | 512.7 |
| EXCITATION PURITY | 8.5 | 7.4 | 5.5 |
| Values below are measured at 4.0 mm. control thickness | | | |
| % LTA | 42.7 | 31.7 | 34.2 |
| % LTC | 44.7 | 33.3 | 35.7 |
| % UV | 12 | 5 | 5.2 |
| % IR | 13.7 | 9.4 | 8.1 |
| % TSET | 26.7 | 19 | 19 |
| Ratio of % LTN/% UV | 3.56 | 6.34 | 6.58 |

Table VI demonstrates glass in the 18 to 30% LTA and a very low UV transmission of 3% or less. It can be readily seen that the addition of manganese dioxide significantly improves the ultra violet absorption of the present invention iron oxide containing glasses. Most desirably, in addition to the significant improvement in the ultra violet absorption of the glass, the invention also improves the visible. transmittance of the glass, as evidenced by the increase of the % LTA. As seen in Example 6, as the amount of $MnO_2$ is increased, the amount of $Fe_2O_3$ also increases. However, the amount of UV transmittance decreases to 1% and the ratio of % LTA/% UV is high (18), thereby requiring a high excitation purity to distinguish the color of the glass.

TABLE VI

| GLASS | Example 4 | Example 5 | Example 6 | Example 7 | Example 8 | Example 9 |
|---|---|---|---|---|---|---|
| WT. % $Fe_2O_3$ | 2 | 2 | 2.5 | 2.5 | 2.5 | 2.5 |
| WT. % FeO | 0.382 | 0.381 | 0.487 | 0.474 | 0.477 | 0.503 |
| WT. % $MnO_2$ | 1 | 1 | 1 | 0.5 | 1 | 0.5 |
| PPM Co | 150 | 125 | 150 | 100 | 125 | 75 |
| PPM Se | 0 | 0 | 0 | 0 | 0 | 0 |
| Values below are measured at 4.0 mm control thickness | | | | | | |
| CHROMATICITY COORDINATE x | 0.2817 | 0.289 | 0.2933 | 0.2981 | 0.2973 | 0.3026 |
| CHROMATICITY COORDINATE y | 0.334 | 0.3423 | 0.3607 | 0.3573 | 0.3606 | 0.3628 |
| DOMINANT WAVELENGTH | 498.6 | 506.7 | 525.5 | 531.9 | 532.1 | 541.6 |
| EXCITATION PURITY | 9.5 | 6.9 | 8.7 | 8.5 | 9.2 | 10.8 |
| % LTA | 24.8 | 27.2 | 18 | 24.2 | 22 | 25.4 |
| % LTC | 20.6 | 28.6 | 19 | 25.3 | 23.1 | 26.5 |
| % UV | 3 | 3 | 1 | 1.9 | 1.5 | 2 |
| % IR | 8.8 | 8.9 | 5 | 5.4 | 5.3 | 4.7 |
| % TSET | 15.9 | 16.7 | 10.2 | 13 | 12 | 12.8 |
| Ratio of % LTA/% UV | 8.27 | 9.07 | 18.00 | 12.74 | 14.67 | 12.70 |

Table VII demonstrates the impact of small quantity of selenium impacts the color, the UV transmittance and the ratio of the % LTA/% UV.

TABLE VII

| GLASS | Example 10 | Example 11 | Example 12 | Example 13 | Example 14 | Example 15 |
|---|---|---|---|---|---|---|
| WT. % $Fe_2O_3$ | 1.5 | 1.5 | 2 | 2 | 2.5 | 2.5 |
| WT. % FeO | 0.28 | 0.302 | 0.274 | 0.382 | 0.362 | 0.454 |
| WT. % $MnO_2$ | 1 | 0.5 | 0.5 | 1 | 0.5 | 1 |
| PPM Co | 150 | 75 | 75 | 150 | 75 | 150 |
| PPM Se | 10 | 7 | 7 | 11 | 7 | 11 |
| CHROMATICITY COORDINATE x | 0.2882 | 0.2973 | 0.3062 | 0.3081 | 0.32 | 0.3277 |
| CHROMATICITY COORDINATE y | 0.3238 | 0.3312 | 0.3396 | 0.352 | 0.3672 | 0.3817 |
| DOMINANT WAVELENGTH | 495.1 | 505.8 | 541.3 | 548.1 | 559.7 | 562.2 |
| EXCITATION PURITY | 7.6 | 4.2 | 5.2 | 9.2 | 16.4 | 22.4 |
| % LTA | 26.9 | 39.5 | 37.6 | 31.5 | 29.3 | 23 |
| % LTC | 28 | 40.8 | 38.4 | 32.4 | 29.8 | 23.3 |

TABLE VII-continued

| GLASS | Example 10 | Example 11 | Example 12 | Example 13 | Example 14 | Example 15 |
|---|---|---|---|---|---|---|
| % UV | 6.3 | 10.9 | 9.5 | 4.6 | 1.7 | 1.5 |
| % IR | 15.5 | 14 | 16.4 | 8.9 | 5.1 | 5.9 |
| % TSET | 21 | 25.2 | 25.4 | 18.1 | 12.2 | 12.3 |
| Ratio of % LTA/% UV | 4.27 | 3.62 | 3.96 | 6.85 | 17.24 | 15.33 |

Example 15 from Table VII represents the highest concentration of $Fe_2O_3$ and selenium in these embodiments of the present invention because the color of the glass is so intense as witnessed by the high 22.4% excitation purity.

It should be noted that none of the glass compositions made according to the present invention examples use expensive cerium oxide, titanium oxide and vanadium pentoxide. It is unexpected and most desirable that the iron oxide can be oxidized using only manganese compounds without the need for any of the compounds to provide oxidizing conditions or the desired color. The fact that the manganese compounds like manganese dioxide are relatively inexpensive provides further commercial desirability to the present invention. Being able to oxidize iron oxide to improve UV absorption while maintaining high visible transmission, since the reduced manganese compound becomes less colored, adds to the unexpected and desirable aspects of the invention.

As can be seen from FIG. 1 and the examples above, the glass in accordance with the present invention provides for very low UV absorption that could eliminate the need for any black band in glass. Further, in order to obtain the green color, use is made of inexpensive oxidizing agents. Additionally, no chromium is used to obtain such green color.

As any person skilled in the art will recognize from the previous description and from the figures and claims, modifications and changes can be made to the preferred embodiment of the invention without departing from the scope of the invention as defined in the following claims.

What is claimed is:

1. A colored glass for use in a motor vehicle having a base and a colorant, the colorant having a composition by weight of the colored glass consisting:

1.3 to 3% wt of iron oxide as $Fe_2O_3$;

0.04 to 1.5% wt. of manganese oxide as $MnO_2$;

0.0075 to 0.025 wt. % cobalt oxide as Co;

optionally up to 0.0025 wt. % selenium;

wherein the colored glass at 4 mm. control thickness has a light transmittance using illuminant A between 15% and 45%, an ultra violet transmittance of less than 13%, such that when the light transmittance using illuminant A Is less than 25%, the ratio of the light transmittance to the ultra violet transmittance is greater than or equal to 5;

color of the colored glass is defined by a chromaticity coordinates inside the polygon ABCDA, the chromaticity coordinates are:

|   | x | y |
|---|---|---|
| A | 0.292 | 0.319 |
| B | 0.25 | 0.33 |
| C | 0.34 | 0.41 |
| D | 0.325 | 0.36; and | wherein the color defined inside the polygon ABCDA is green.

2. The colored glass of claim 1 wherein the chromaticity coordinates inside the polygon ABCDA are:

|   | x | y |
|---|---|---|
| A | 0.293 | 0.32 |
| B | 0.26 | 0.332 |
| C | 0.308 | 0.376 |
| D | 0.309 | 0.34. |

3. The colored glass of claim 1 wherein the colored glass at 4 mm. control thickness has a light transmittance using illuminant A between 15% and 24%, the ultra violet transmittance is less than 10%.

4. The colored glass of claim 1 wherein the colored glass at 4 mm. thickness has an infrared transmittance in the range of 4% to 26%.

5. The colored glass of claim 1 wherein the colored glass at 4 mm. thickness has an excitation purity in the range of 4% to 25%.

6. The colored glass of claim 1 wherein the colored glass at 4 mm. thickness has dominant wavelength in the range of 494–563 nanometers.

7. A colored glass for use in a motor vehicle having a base and a colorant, wherein the base having a composition by weight of the colored glass comprising 70 to 71% $SiO_2$, 12 to 13% $Na_2O$, 7 to 8% CaO, 3 to 4% MgO, 0 to 1% $Al_2O_3$; 0 to 1% $K_2O$;

the colorent having a composition by weight of the colored glass consisting 1.3 to 3% wt of iron oxide as $Fe_2O_3$; 0.04 to 1.5% wt. of manganese oxide as $MnO_2$, 0.0075 to 0.025 wt. % cobalt oxide as Co; optionailly up to 0.0025 wt. % of selenium;

the colored glass at 4 mm. control thickness has a light transmittance using illuminant A between 15% and 45%, an ultra violet transmittance of less than 13% such that when the light transmittance using illuminant A is less than 25%, the ratio of the light transmittance to the ultra violet transmittance is greater than or equal to 5;

the colored glass at 4 mm. control thickness has an infrared transmittance in the range of 4% to 26%; and wherein color of the colored glass is defined by a chromaticity coordinates inside the polygon ABCDA, such that the polygon ABCDA defines a green color.

8. The colored glass of claim 7 wherein, the chromaticity coordinates inside the polygon ABCDA are:

|   | x     | y     |
|---|-------|-------|
| A | 0.292 | 0.319 |
| B | 0.25  | 0.33  |
| C | 0.34  | 0.41  |
| D | 0.325 | 0.36. |

9. The colored glass of claim 8 wherein the chromaticity coordinates inside the polygon ABCDA are:

|   | x     | y     |
|---|-------|-------|
| A | 0.293 | 0.32  |
| B | 0.26  | 0.332 |
| C | 0.308 | 0.376 |
| D | 0.309 | 0.34. |

10. The colored glass of claim 7 wherein the colored glass at 4 mm. control thickness has a light transmittance using illuminant A between 15% and 24%, an ultra violet transmittance of less than 10%.

11. The colored glass of claim 7 wherein the colored glass at 4 mm. thickness has an excitation purity in the range of 4% to 25%.

12. The colored glass of claim 7 wherein the colored glass at 4 mm. thickness has dominant wavelength in the range of 494–563 nanometers.

* * * * *

UNITED STATES PATENT AND TRADEMARK OFFICE
CERTIFICATE OF CORRECTION

PATENT NO.    : 6,632,760 B2                                              Page 1 of 1
DATED         : October 14, 2003
INVENTOR(S)   : Edward N. Boulos et al.

It is certified that error appears in the above-identified patent and that said Letters Patent is hereby corrected as shown below:

<u>Column 9,</u>
Line 55, after "A" delete "Is" and substitute -- is -- in its place.

Signed and Sealed this

Thirteenth Day of January, 2004

JON W. DUDAS
*Acting Director of the United States Patent and Trademark Office*